(12) United States Patent
Dinh

(10) Patent No.: US 7,557,308 B2
(45) Date of Patent: Jul. 7, 2009

(54) WALL RECESSED OUTLET BOX ASSEMBLY

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/484,955

(22) Filed: Jul. 12, 2006

(65) Prior Publication Data

US 2006/0249306 A1 Nov. 9, 2006

Related U.S. Application Data

(63) Continuation of application No. 11/131,597, filed on May 18, 2005, now Pat. No. 7,078,618, and a continuation-in-part of application No. 29/205,607, filed on May 18, 2004, now Pat. No. Des. 545,276.

(60) Provisional application No. 60/572,276, filed on May 18, 2004.

(51) Int. Cl.
*H02G 3/08* (2006.01)
*H02G 3/10* (2006.01)
(52) U.S. Cl. .......................... 174/481; 174/480; 174/50; 174/53; 220/3.2; 220/3.3; 248/906
(58) Field of Classification Search .................. 174/480, 174/481, 50, 53, 57, 58, 520, 59, 61, 63, 174/66, 67; 220/3.2–3.9, 4.02, 241, 242; 439/535, 536, 537, 538, 527; 248/906; D13/152, D13/177
See application file for complete search history.

(56) References Cited

U.S. PATENT DOCUMENTS

| 691,874 A | 1/1902 | Robinson |
|---|---|---|
| 916,436 A | 3/1909 | Greenfield |
| 1,694,054 A | 12/1928 | Both |
| 1,775,665 A | 9/1930 | Behm |
| 2,272,846 A | 2/1942 | Lindstrom |
| 2,378,861 A | 6/1945 | Peevey |

(Continued)

FOREIGN PATENT DOCUMENTS

CA 644330 7/1962

OTHER PUBLICATIONS

U.S. Appl. No. 11/401,495, filed on Apr. 10, 2006.

(Continued)

*Primary Examiner*—Angel R Estrada
(74) *Attorney, Agent, or Firm*—Hoffmann & Baron, LLP

(57) ABSTRACT

An outlet box assembly includes an outer faceplate having an interior opening. An inner faceplate is connected to the outer faceplate such that the inner faceplate is recessed from the outer faceplate and access to the inner faceplate is provided through the interior opening. The inner faceplate has an outlet port and a communication port. The outlet box assembly further includes a support housing having an inner surface and an interior region bounded by the inner surface. The support housing is connected to a rear surface of the inner faceplate such that the outlet port provides access to the interior region. The support housing is configured to allow insertion of an electrical receptacle into the interior region and to provide an enclosure for the electrical receptacle.

6 Claims, 18 Drawing Sheets

U.S. PATENT DOCUMENTS

| | | |
|---|---|---|
| 2,433,917 A | 1/1948 | McCartney |
| 2,510,745 A | 6/1950 | Kilgore |
| 2,514,745 A | 7/1950 | Dalzell |
| 2,531,698 A | 11/1950 | Petrick et al. |
| 2,757,817 A | 8/1956 | Egan |
| 2,828,394 A | 3/1958 | Mayzik |
| 2,916,733 A | 12/1959 | Hirsch |
| 2,989,206 A | 6/1961 | McAfee |
| 3,168,613 A | 2/1965 | Palmer |
| 3,289,852 A | 12/1966 | Kahn |
| 3,365,156 A | 1/1968 | Beck |
| D214,449 S | 6/1969 | Greene |
| 3,530,230 A | 9/1970 | Cormier et al. |
| 3,622,029 A | 11/1971 | Ware |
| 3,701,451 A | 10/1972 | Schindler et al. |
| 3,834,658 A | 9/1974 | Theodorides |
| 3,864,511 A | 2/1975 | Morby et al. |
| 3,917,899 A | 11/1975 | Oliver |
| 4,059,327 A | 11/1977 | Vann |
| 4,062,470 A | 12/1977 | Boteler |
| 4,098,423 A | 7/1978 | Marrero |
| 4,109,095 A | 8/1978 | Kling et al. |
| 4,134,636 A | 1/1979 | Kleinatland et al. |
| 4,265,365 A | 5/1981 | Boteler |
| 4,417,373 A | 11/1983 | Keglewitsch |
| 4,424,407 A | 1/1984 | Barbic |
| 4,438,859 A | 3/1984 | Solek |
| 4,443,654 A | 4/1984 | Flachbarth et al. |
| 4,451,108 A | 5/1984 | Skidmore |
| 4,505,403 A | 3/1985 | Bowden, Jr. et al. |
| 4,559,410 A | 12/1985 | Hostetter |
| 4,599,485 A | 7/1986 | Smolik |
| 4,603,229 A | 7/1986 | Menchetti |
| 4,603,932 A | 8/1986 | Heverly |
| 4,605,817 A | 8/1986 | Lopez |
| 4,613,728 A | 9/1986 | Lathrop |
| 4,634,015 A | 1/1987 | Taylor |
| 4,636,914 A | 1/1987 | Belli |
| 4,642,418 A | 2/1987 | Menchetti |
| 4,673,097 A | 6/1987 | Schuldt |
| 4,684,092 A | 8/1987 | Reiker |
| 4,685,581 A | 8/1987 | Kaneda et al. |
| 4,721,476 A | 1/1988 | Zeliff et al. |
| 4,724,281 A | 2/1988 | Nix et al. |
| 4,747,506 A | 5/1988 | Stuchilk, III |
| 4,758,687 A | 7/1988 | Lathrop |
| 4,778,399 A | 10/1988 | Schenk |
| 4,803,307 A | 2/1989 | Shotey |
| 4,927,039 A | 5/1990 | McNab |
| D308,464 S | 6/1990 | Freeman et al. |
| 4,936,794 A | 6/1990 | Shaw et al. |
| 4,971,280 A | 11/1990 | Rinderer |
| 4,972,045 A | 11/1990 | Primeau |
| 4,988,832 A | 1/1991 | Shotey |
| 5,008,491 A | 4/1991 | Bowman |
| 5,012,043 A | 4/1991 | Seymour |
| 5,042,673 A | 8/1991 | McShane |
| 5,085,393 A | 2/1992 | Ryan |
| 5,114,365 A | 5/1992 | Thompson et al. |
| 5,117,122 A | 5/1992 | Hogarth et al. |
| 5,117,996 A | 6/1992 | McShane |
| 5,142,102 A | 8/1992 | Michie |
| 5,171,939 A | 12/1992 | Shotey |
| 5,218,169 A | 6/1993 | Riceman |
| 5,243,134 A | 9/1993 | Nattel |
| 5,245,507 A | 9/1993 | Ericksen |
| 5,257,946 A | 11/1993 | MacMillan et al. |
| 5,280,135 A | 1/1994 | Berlin et al. |
| D343,825 S | 2/1994 | Enderby |
| 5,287,665 A | 2/1994 | Rath, Jr. |
| 5,289,934 A | 3/1994 | Smith et al. |
| D348,870 S | 7/1994 | Warrington |
| 5,326,060 A | 7/1994 | Chubb et al. |
| 5,369,548 A | 11/1994 | Combs |
| 5,389,740 A | 2/1995 | Austin |
| 5,419,716 A | 5/1995 | Sciammarella et al. |
| 5,420,376 A | 5/1995 | Rajecki et al. |
| 5,434,359 A | 7/1995 | Schnell |
| 5,466,886 A | 11/1995 | Lengyel et al. |
| 5,486,650 A | 1/1996 | Yetter |
| 5,522,577 A | 6/1996 | Roesch |
| 5,533,637 A | 7/1996 | Williams, Jr. |
| 5,549,266 A | 8/1996 | Mitchell et al. |
| 5,574,255 A | 11/1996 | Simmons |
| 5,574,256 A | 11/1996 | Cottone |
| 5,596,174 A | 1/1997 | Sapienza |
| 5,598,998 A | 2/1997 | Lynn |
| 5,600,093 A | 2/1997 | Herth et al. |
| 5,603,424 A | 2/1997 | Bordwell et al. |
| 5,613,876 A | 3/1997 | Sakatani et al. |
| 5,651,696 A | 7/1997 | Jennison |
| 5,683,005 A | 11/1997 | Mordick |
| 5,773,760 A | 6/1998 | Stark et al. |
| 5,804,764 A | 9/1998 | Gretz |
| 5,918,431 A | 7/1999 | Schiedegger et al. |
| 5,931,325 A | 8/1999 | Filipov |
| 5,934,917 A | 8/1999 | Haut |
| 5,967,354 A | 10/1999 | Whitehead et al. |
| 5,975,323 A | 11/1999 | Turan |
| 6,026,605 A | 2/2000 | Tippett |
| 6,028,267 A | 2/2000 | Byrne |
| 6,028,268 A | 2/2000 | Stark et al. |
| D422,266 S | 4/2000 | Roesch |
| 6,093,890 A | 7/2000 | Gretz |
| 6,102,360 A | 8/2000 | Clegg et al. |
| 6,112,927 A | 9/2000 | Gretz |
| 6,127,630 A | 10/2000 | McKenzie et al. |
| 6,147,304 A | 11/2000 | Doherty |
| 6,172,298 B1 | 1/2001 | Norvelle |
| 6,194,657 B1 | 2/2001 | Gretz |
| 6,198,045 B1 | 3/2001 | Roesch |
| 6,200,159 B1 | 3/2001 | Chou |
| 6,207,895 B1 | 3/2001 | Engel |
| 6,222,124 B1 | 4/2001 | Pritchard et al. |
| 6,239,368 B1 | 5/2001 | Gretz |
| 6,268,563 B1 | 7/2001 | Gretz |
| 6,323,424 B1 | 11/2001 | He |
| 6,346,674 B1 | 2/2002 | Gretz |
| 6,355,882 B1 | 3/2002 | Gretz |
| 6,414,241 B1 | 7/2002 | O'Donnell |
| 6,414,906 B1 | 7/2002 | Gaspari |
| 6,429,371 B2 | 8/2002 | Schiedegger et al. |
| 6,437,242 B1 | 8/2002 | Radosavljevic et al. |
| D462,939 S | 9/2002 | Dinh |
| D463,376 S | 9/2002 | Roesch et al. |
| 6,444,906 B1 | 9/2002 | Lewis |
| D463,969 S | 10/2002 | Luu |
| D467,229 S | 12/2002 | Heggem |
| 6,557,305 B1 | 5/2003 | Hayes |
| 6,563,051 B1 | 5/2003 | Shotey et al. |
| 6,566,602 B1 | 5/2003 | Miller et al. |
| 6,576,835 B1 | 6/2003 | Ford et al. |
| 6,586,679 B2 | 7/2003 | Bashford |
| D478,553 S | 8/2003 | Heggem |
| 6,608,253 B1 | 8/2003 | Rintz |
| 6,637,166 B2 | 10/2003 | Kinsey |
| 6,727,428 B2 | 4/2004 | Archer et al. |
| 6,737,576 B1 | 5/2004 | Dinh |
| 6,753,471 B2 | 6/2004 | Johnson et al. |
| D495,301 S | 8/2004 | Newell |
| 6,808,079 B2 | 10/2004 | Lalancette et al. |
| 6,818,823 B2 | 11/2004 | Barnes |
| 6,843,669 B2 | 1/2005 | Drane et al. |
| 6,858,802 B2 | 2/2005 | Hagarty et al. |

| | | |
|---|---|---|
| 6,872,887 B2 | 3/2005 | Shotey et al. |
| 6,908,003 B2 | 6/2005 | Feyes et al. |
| 6,953,894 B2 | 10/2005 | Ungerman et al. |
| 6,956,171 B1 | 10/2005 | Gretz |
| 6,965,078 B1 | 11/2005 | Gretz |
| 7,005,578 B2 | 2/2006 | Gretz |
| 7,009,111 B1 | 3/2006 | Rintz |
| 7,038,131 B1 | 5/2006 | Gretz |
| 7,044,318 B2 | 5/2006 | Gates, II |
| 7,064,268 B2 | 6/2006 | Dinh |
| 7,078,618 B2 | 7/2006 | Dinh |
| 7,105,745 B2 | 9/2006 | Drane et al. |
| 7,109,419 B1 | 9/2006 | Gretz |
| 7,205,488 B2 | 4/2007 | Riner |
| 7,374,058 B2 | 5/2008 | Dinh et al. |
| 7,431,594 B2 | 10/2008 | Castaldo et al. |
| 2003/0024927 A1 | 2/2003 | MacDonald |
| 2003/0178421 A1 | 9/2003 | Almond |
| 2004/0123996 A1 | 7/2004 | Lalancette et al. |
| 2004/0238197 A1 | 12/2004 | Gates, II |
| 2005/0072778 A1 | 4/2005 | Hull et al. |
| 2008/0017413 A1 | 1/2008 | Dinh |

OTHER PUBLICATIONS

U.S. Appl. No. 29/211,493, filed Aug. 17, 2004, Cong Thanh Dinh, USPTO Filing Receipt, specification and drawings.
U.S. Appl. No. 29/205,607, filed May 18, 2004, Cong Thanh Dinh, USPTO Filing Receipt, specification and drawings.
Gottardo et al. (US 2005/0183873) "Electrical Distribution Box" Aug. 25, 2005.
U.S. Appl. No. 11/401,495, filed Apr. 10, 2006, Dinh.
TayMac Corporation, 2003 Catalog, pp. 1-14.
U.S. Appl. No. 11/188,047, filed Jul. 31, 2007 corresponding to U.S. Publication No. 2008-0017413-A1.

WALL RECESSED OUTLET BOX ASSEMBLY

CROSS-REFERENCE TO RELATED APPLICATIONS

This patent application is a continuation of U.S. patent application Ser. No. 11/131,597, filed on May 18, 2005 now U.S. Pat. No. 7,078,618 which claims priority to and the benefit of U.S. Provisional Patent Application No. 60/572,276 filed on May 18, 2004, the entire disclosures of both applications are hereby incorporated by reference. U.S. patent application Ser. No. 11/131,587 is a continuation-in-part of U.S. Design Patent Application No. 29/205,607 filed on May 18, 2004 now U.S. Pat. No. D.545,276, the entire disclosure of which is hereby incorporated by reference.

BACKGROUND OF THE INVENTION

The present invention relates generally to outlet boxes for mounting electrical outlets and connectors on wall structures, and more particularly, to such an outlet box in which the electrical outlet and connector is recessed from the wall structure.

Electrical outlet boxes which support an electrical receptacle and a connector are known. Such outlet boxes may support the electrical receptacle in the plane of the outer surface of the wall structure. As a result, when a plug is inserted into the electrical receptacle which is so supported, the plug extends outward of the wall surface. The electrical plug is thereby exposed to being struck by a transverse force such as from a person, piece of furniture or other object which may move along the side of the wall structure in close proximity thereto. If such a transverse force is sufficient, it may dislodge the plug from the electrical receptacle, either partially or completely, or cause damage to the plug or receptacle, as well as a combination thereof. Additionally, extension of the electrical plug beyond the outer surface of the wall structure normally prevents the positioning of a piece of furniture, wall hanging or similar object in close proximity to the outer surface of the wall in the vicinity of the electrical receptacle. Such an object may, for example, be a television which would desirably be positioned close to the outer surface of the wall structure in front of and adjacent to the electrical receptacle. This would enable the power cable from the television to extend to the electrical receptacle for connection thereto and for the power cable and electrical receptacle to be obstructed from view by the television.

To reduce the extension of the electrical plug beyond the outer surface of the wall structure, electrical boxes may be configured to support the electrical receptacle in a recessed position relative to the outer surface of the wall structure. This recessed position of the electrical receptacle reduces or, if sufficient, eliminates entirely the exposure of the electrical plug to the aforementioned undesirable forcible contact.

Additionally, electronic devices frequently require connection to an electrical power source and a separate connection to a communication network, such as a telephone or television network, or a local area network (LAN) or the internet for computers. Examples of such electrical devices include telephones, televisions, answering machines and personal computers. Such requirements typically result in separate electrical cables extending from the electronic devices where the power cable is connected to an electrical receptacle and the communication cable is connected to a separate connector, such as a telephone jack, or a connector for digital data transmission or for a coaxial cable.

To provide the required connection for such cables, the electrical outlet box may have an additional connector for such a cable. Such a cable typically has a cable plug which is coupled to the additional connector. The additional connector may be recessed from the outer surface of the wall structure to reduce the extension of the cable plug which is coupled thereto. This reduction of the extension of the cable plug may limit or eliminate entirely the exposure thereof to undesirable forcible contact, and the unfavorable consequences, similar to those which may befall an electrical plug which extends beyond the outer surface of the wall structure, as described herein above.

The electrical receptacle may be supported within the outlet box by securing the front surface of the electrical receptacle to a vertical flange or similar structure within the outlet box. This may be the only support provided to the electrical receptacle within the outlet box. This limited support may result from clearances being provided between the outer surfaces of the electrical receptacle which do not contact the vertical flange or other support structure within the outlet box. This limited support may necessitate a high strength connection between the limited surface of the electrical receptacle which is directly attached to the outlet box. In the absence of such a high strength connection, the electrical receptacle may undesirably translate or pivot relative to the outlet box, such as when the electrical plug is inserted into the electrical receptacle or if the electrical plug, after insertion thereof into the electrical receptacle, is contacted by an external force.

SUMMARY OF THE INVENTION

The outlet box assembly of the present invention includes an outer faceplate having an interior opening. An inner faceplate is connected to the outer faceplate such that the inner faceplate is recessed from the outer faceplate and access to the inner faceplate is provided through the interior opening. The inner faceplate has an outlet port and a communication port.

The outlet box assembly further includes a support housing having an inner surface and an interior region bounded by the inner surface. The support housing is connected to a rear surface of the inner faceplate such that the outlet port provides access to the interior region. The support housing is configured to allow insertion of an electrical receptacle into the interior region and to provide an enclosure for the electrical receptacle.

The enclosure of the electrical receptacle by the support housing provides protection to the electrical receptacle and limits access thereto which is normally desirable. The connection of the support housing to the rear surface of the inner faceplate, and the recess of the inner faceplate from the outer faceplate provides for the recess of the electrical receptacle from the outer faceplate. Consequently, an electrical plug, which may be inserted into the electrical receptacle, is recessed from the outer faceplate thereby reducing the the likelihood of the electrical plug being contacted by an external force. Also, the recess of the inner faceplate from the outer faceplate results in the communication port being recessed from the outer faceplate. A receptacle may be supported in the communication port and a cable plug may be inserted into the receptacle. The recess of the communication port results in the cable plug being recessed which reduces the likelihood of the cable plug being contacted by an external force.

These and other features of the invention will be more fully understood from the following description of specific embodiments of the invention taken together with the accompanying drawings.

BRIEF DESCRIPTION OF THE DRAWINGS

In the drawings.

Corresponding reference characters indicate corresponding parts throughout the several views of the drawings.

DETAILED DESCRIPTION OF THE INVENTION

Figure 1:
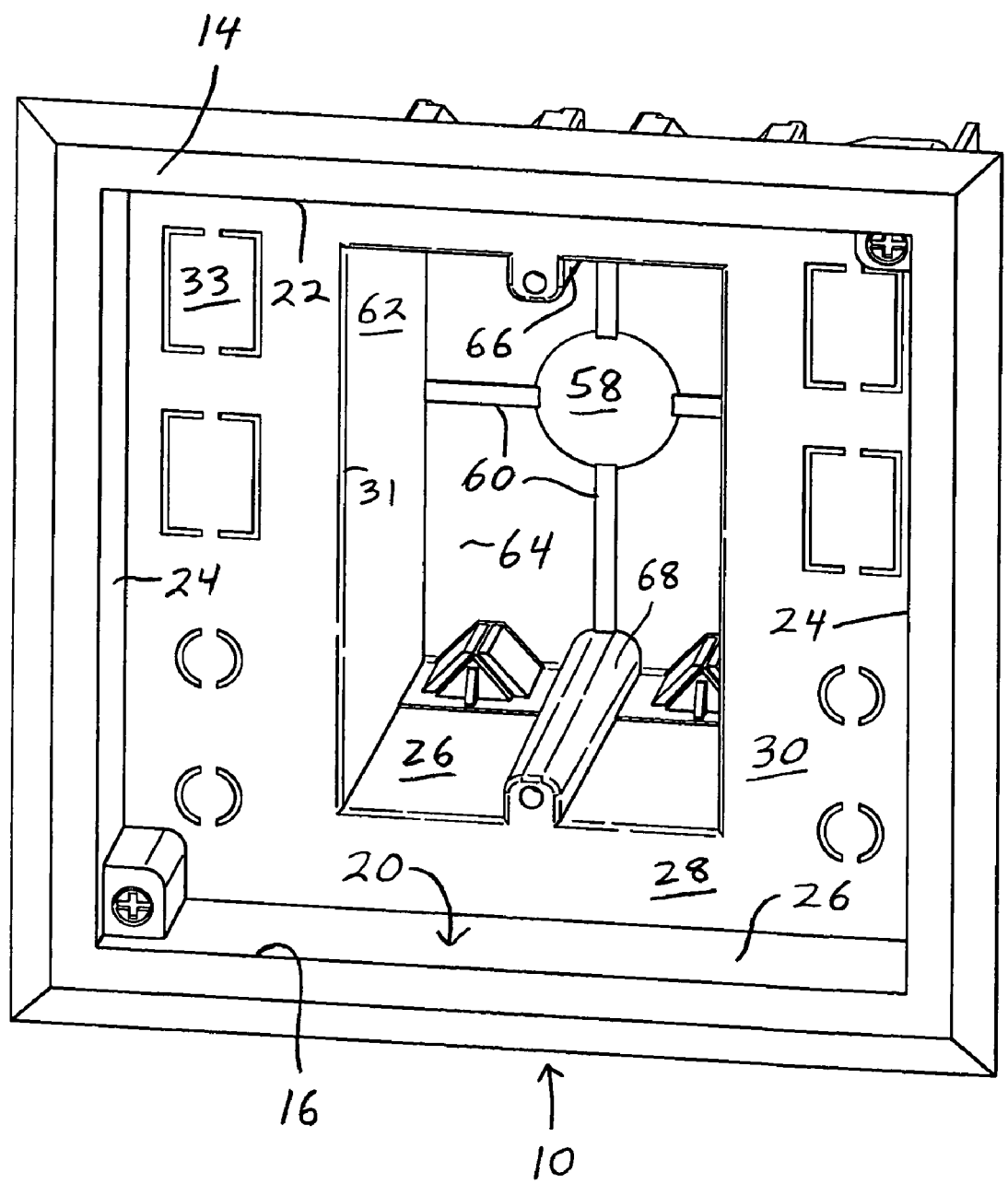
FIG. 1 is a front perspective view of the wall recessed outlet box assembly of the present invention before assembly of the electrical receptacle and interior faceplate thereto and removal of the knockouts from the outer faceplate.

Referring to the drawings and more particularly to FIGS. 1 to 7, a wall recessed outlet box assembly 10 is shown for mounting to a wall structure 12, such as the vertical wall board of an interior wall of a building structure.

The outlet box assembly 10 includes an outer faceplate 14 which has an interior opening 16 and a rear surface 18. The outer faceplate 14 is planar and has an outer edge which may be beveled.

A flange structure 20 is fixed to the rear surface 18 and has a top flange 22, a pair of side flanges 24, and a bottom flange 26 which are fixed to one another such that each of the side flanges is between the top and bottom flanges in perpendicular relation thereto. This results in the flange structure 20 having a vertical cross-section which is rectangular.

The outlet box assembly 10 includes an inner faceplate 28 having a front surface 30 which is fixed to the rear edges of the flange structure 20 such that the inner faceplate is recessed from the outer faceplate 14. The inner faceplate 28 is planar and parallel to the outer faceplate. Access to the inner faceplate 28 is provided through the interior opening 16.

Figure 2:
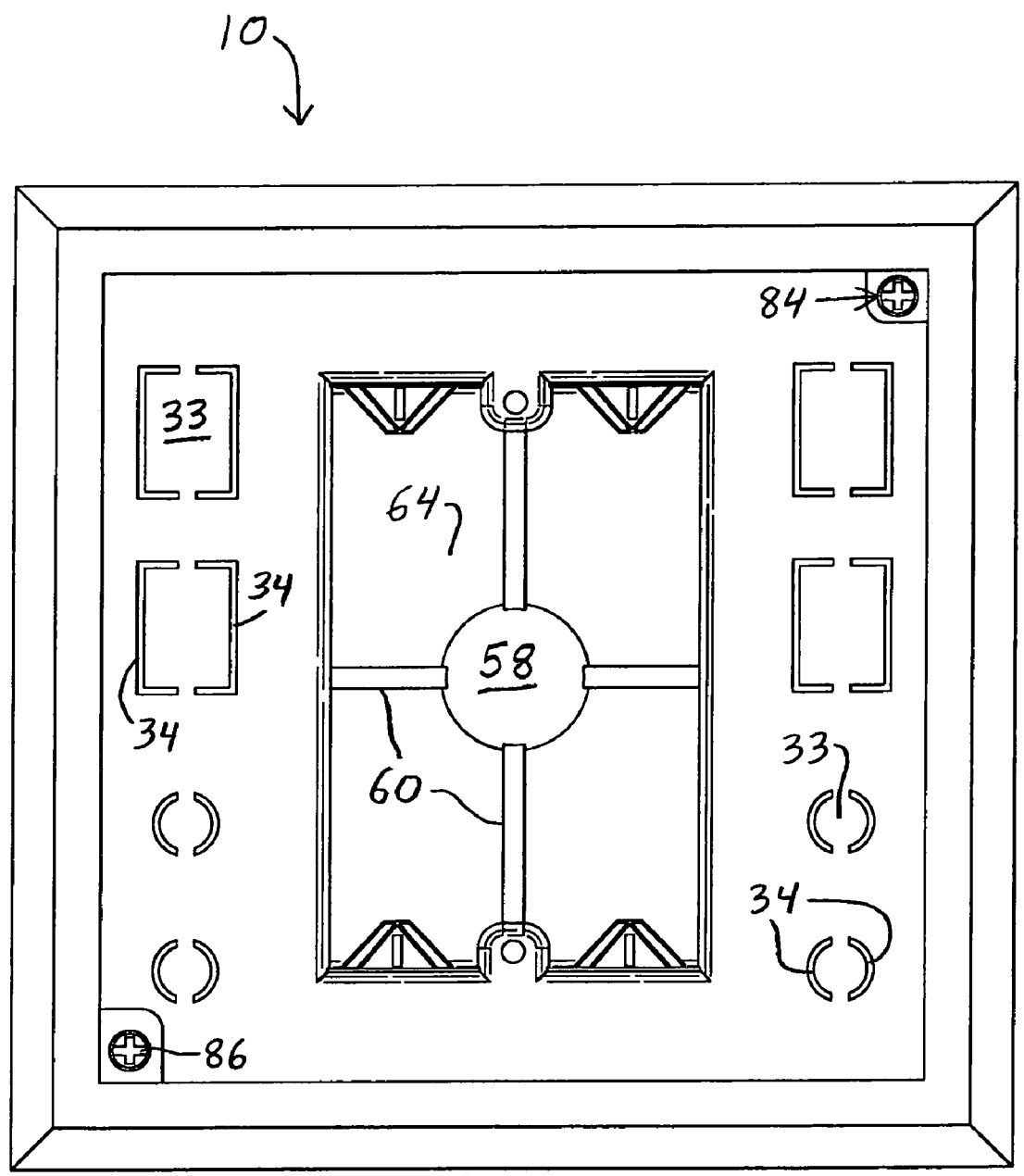
FIG. 2 is a front elevation view of the outlet box assembly of FIG. 1.

The inner faceplate 28 has an outlet port 31 and knockouts 33. The outer peripheries of the knockouts 33 are indented in the rearward direction to form grooves 34 as shown in FIG. 2. The grooves 34 may be indented by a dimension, such as 50 mils. The rear ends of the knockouts 33 do not extend to the rear surface 35 of the inner faceplate 28 resulting in the knockouts being indented in the forward direction. These indentations of the knockouts 33 may be by a dimension, such as 50 mils. The knockouts 33 are removed to provide communication ports 36 in the inner faceplate 28. The communication ports 36 provide openings in which receptacles, such as telephone jacks, co-axial cable connectors or plugs for electrical cables, may be supported. Such cables may be for telephone, cable television, personal computers, data transmissions or digital communications. The communication ports 36 may be referred to as data ports.

Figure 8:
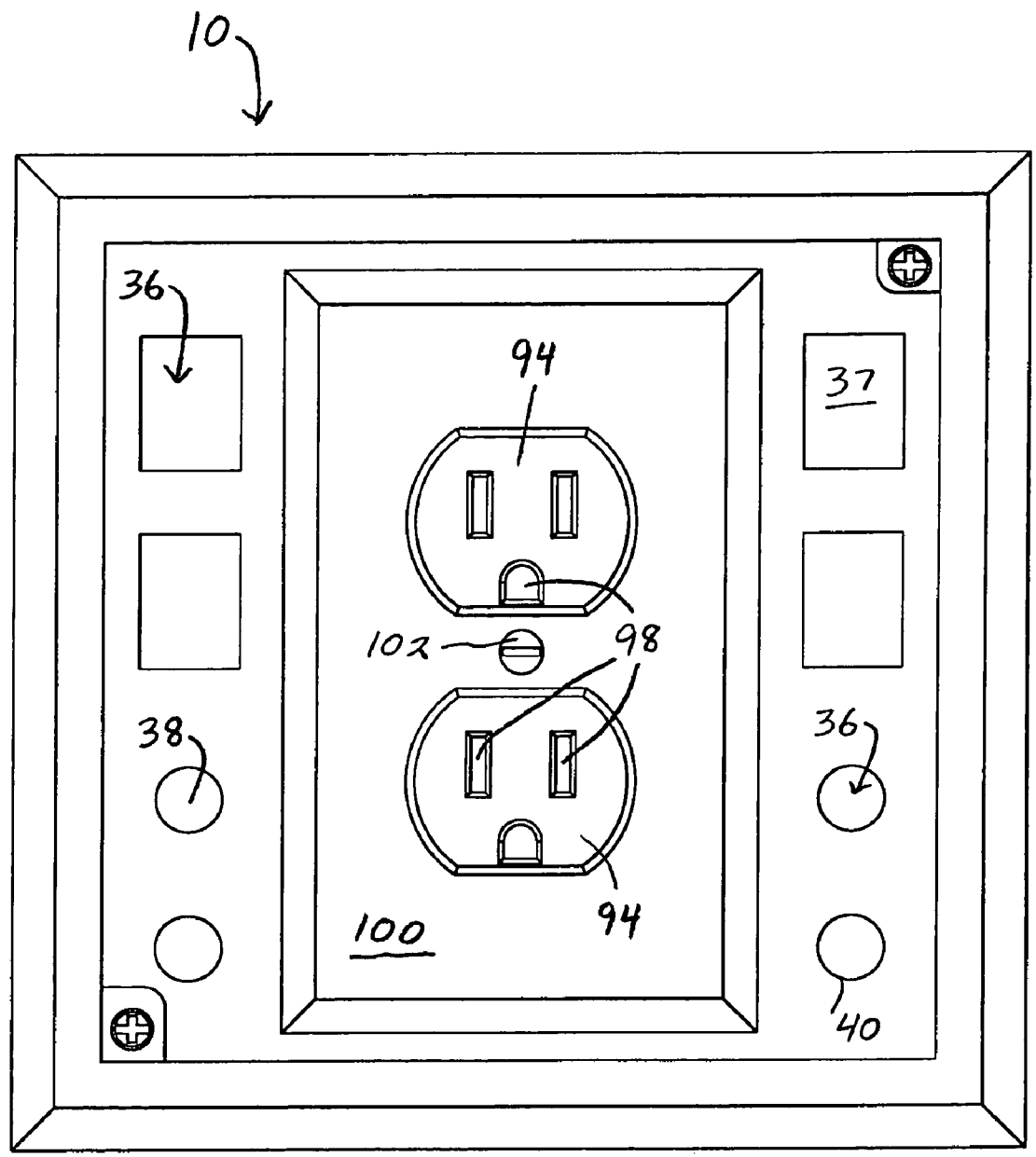
FIG. 8 is a front elevation view of the outlet box assembly of FIG. 1 after assembly of the electrical receptacle and interior faceplate thereto and removal of the knockouts from the outer faceplate.
Figure 9:
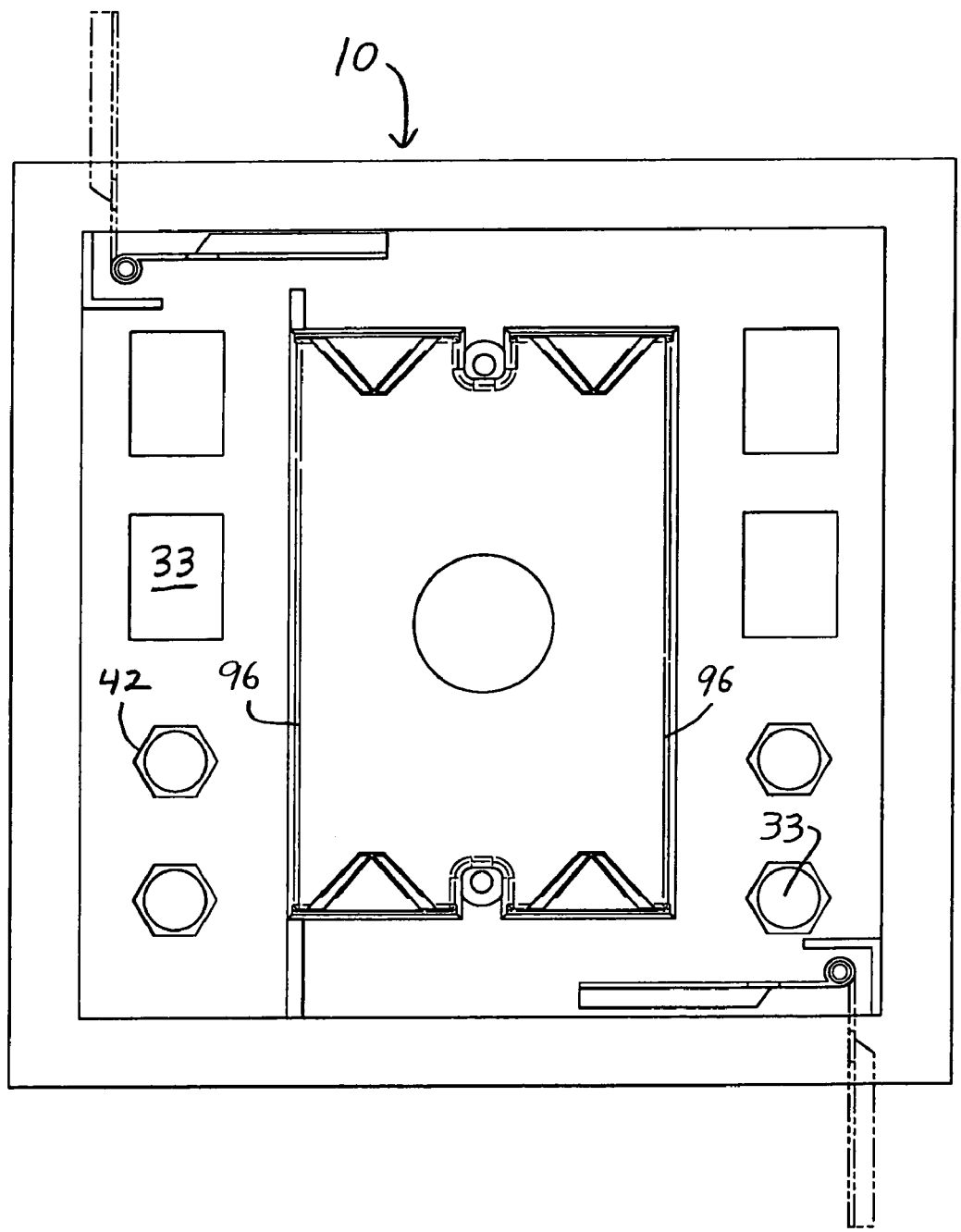
FIG. 9 is a rear elevation view of the outlet box assembly of FIG. 8 showing the arms in the retracted and clamped positions.
Figure 10:
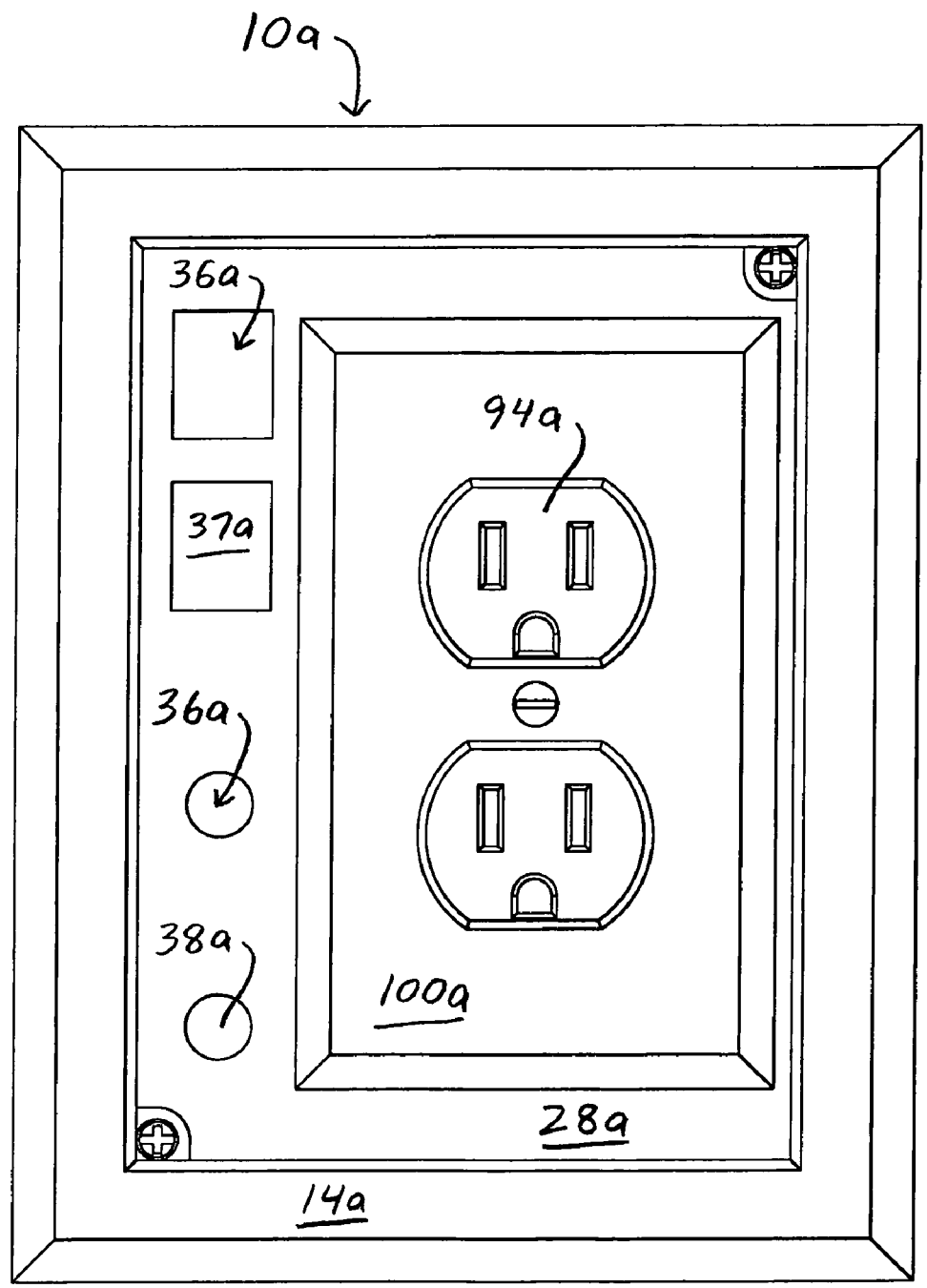
FIG. 10 is a front elevation view of an alternative second embodiment of the outlet box assembly of FIG. 1 after assembly of the electrical receptacle and interior faceplate thereto and removal of the knockouts from the outer faceplate, the outlet box assembly having an alternative configuration of the communication ports.
Figure 11:
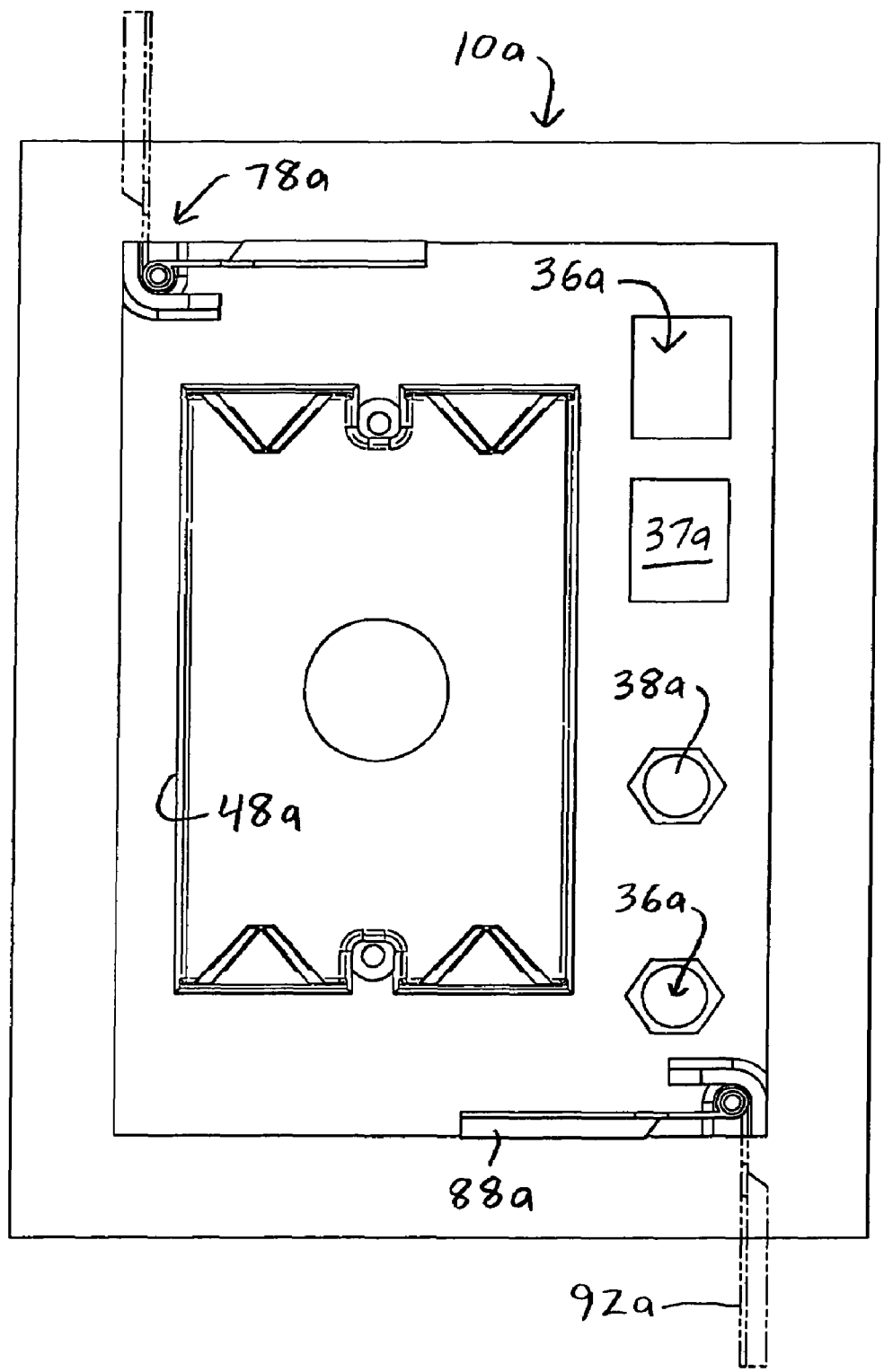
FIG. 11 is a rear elevation view of the outlet box assembly of FIG. 10 showing the arms in the retracted and clamped positions.
Figure 12:
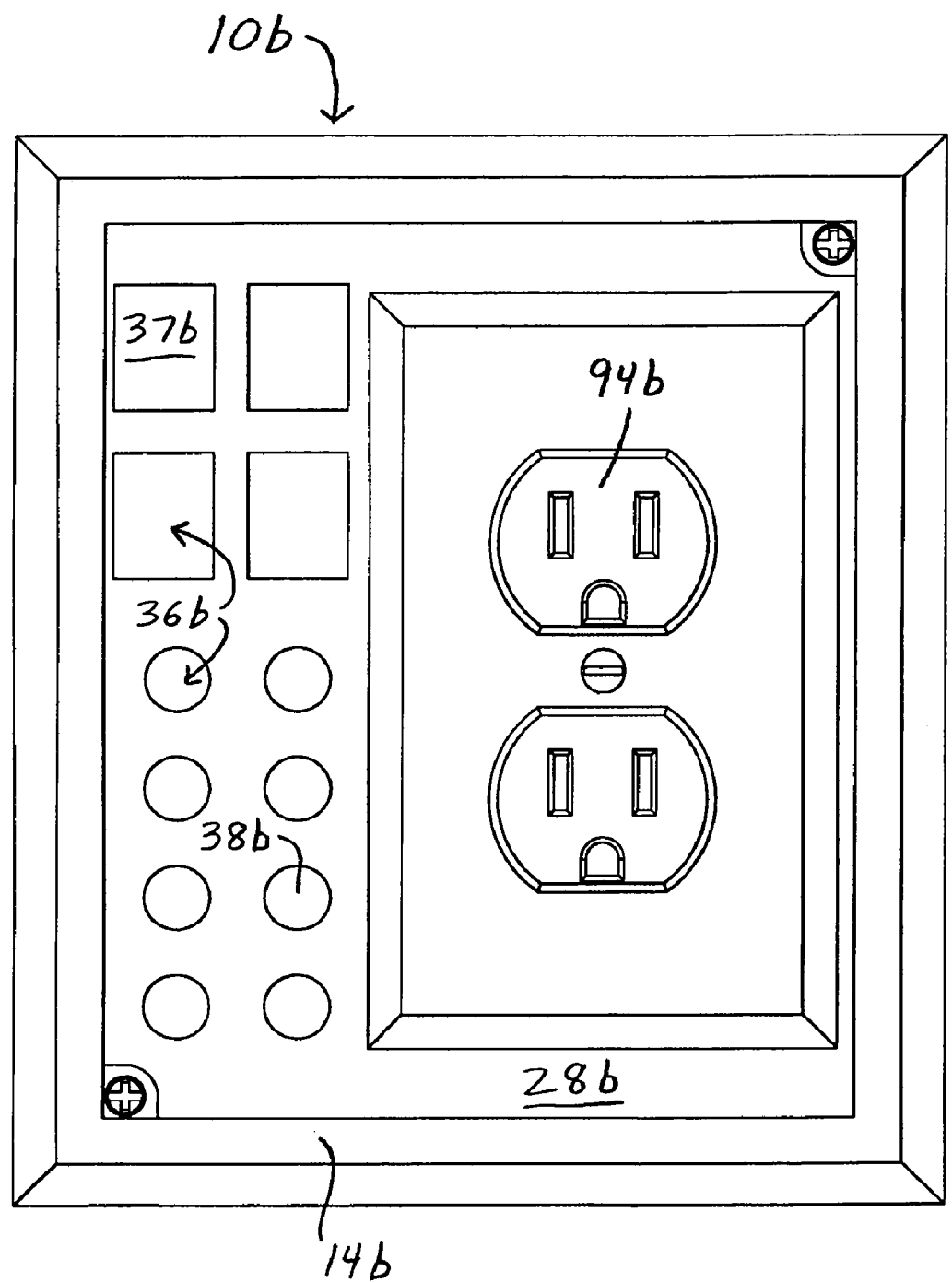
FIG. 12 is a front elevation view of an alternative third embodiment of the outlet box assembly of FIG. 1 after assembly of the electrical receptacle and interior faceplate thereto and removal of the knockouts from the outer faceplate, the outlet box assembly having an alternative configuration of the communication ports.
Figure 13:
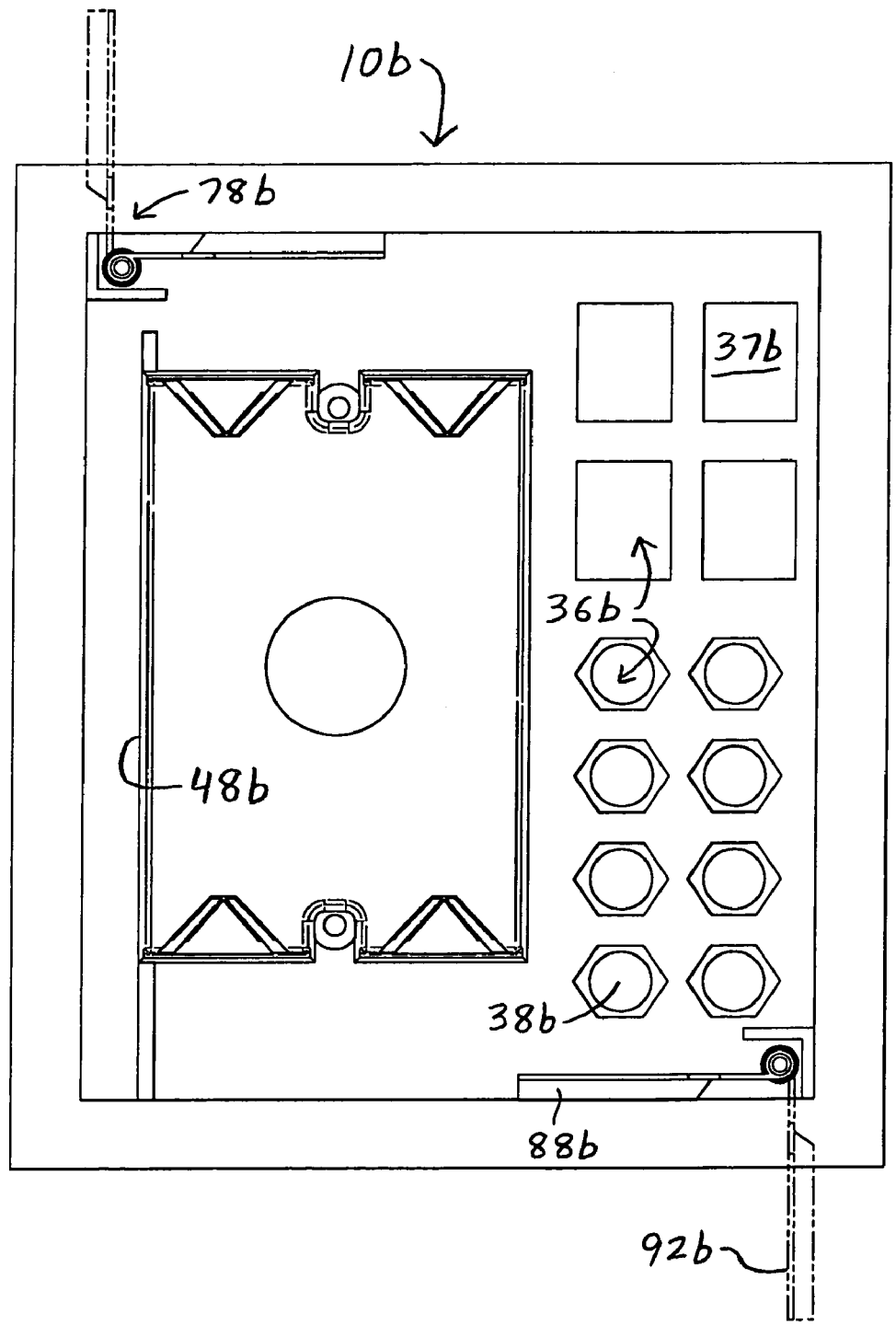
FIG. 13 is a rear elevation view of the outlet box assembly of FIG. 12 showing the arms in the retracted and clamped positions.
Figure 14:
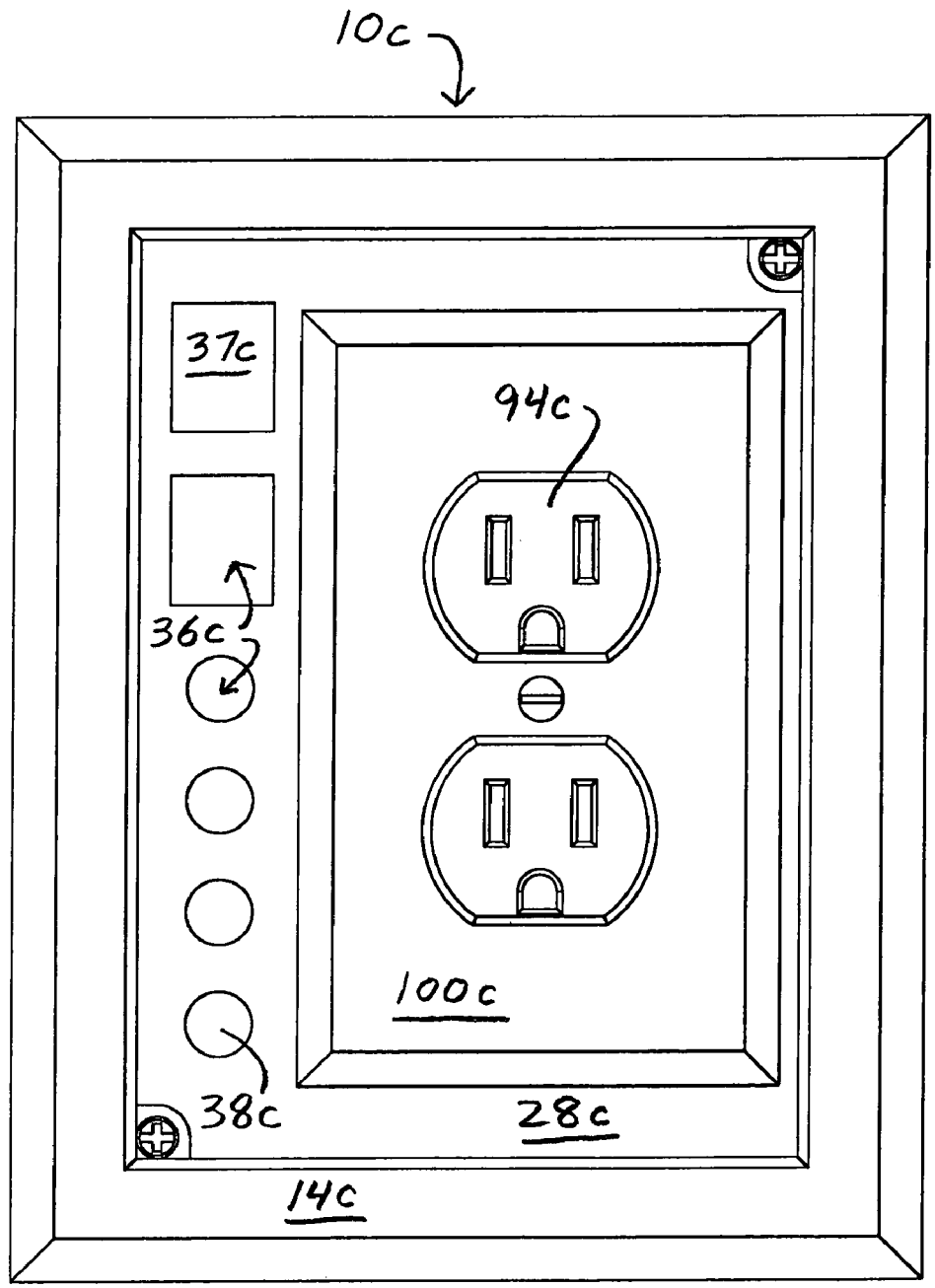
FIG. 14 is a front elevation view of an alternative fourth embodiment of the outlet box assembly of FIG. 1 after assembly of the electrical receptacle and interior faceplate thereto and removal of the knockouts from the outer faceplate, the outlet box assembly having an alternative configuration of the communication ports.
Figure 15:
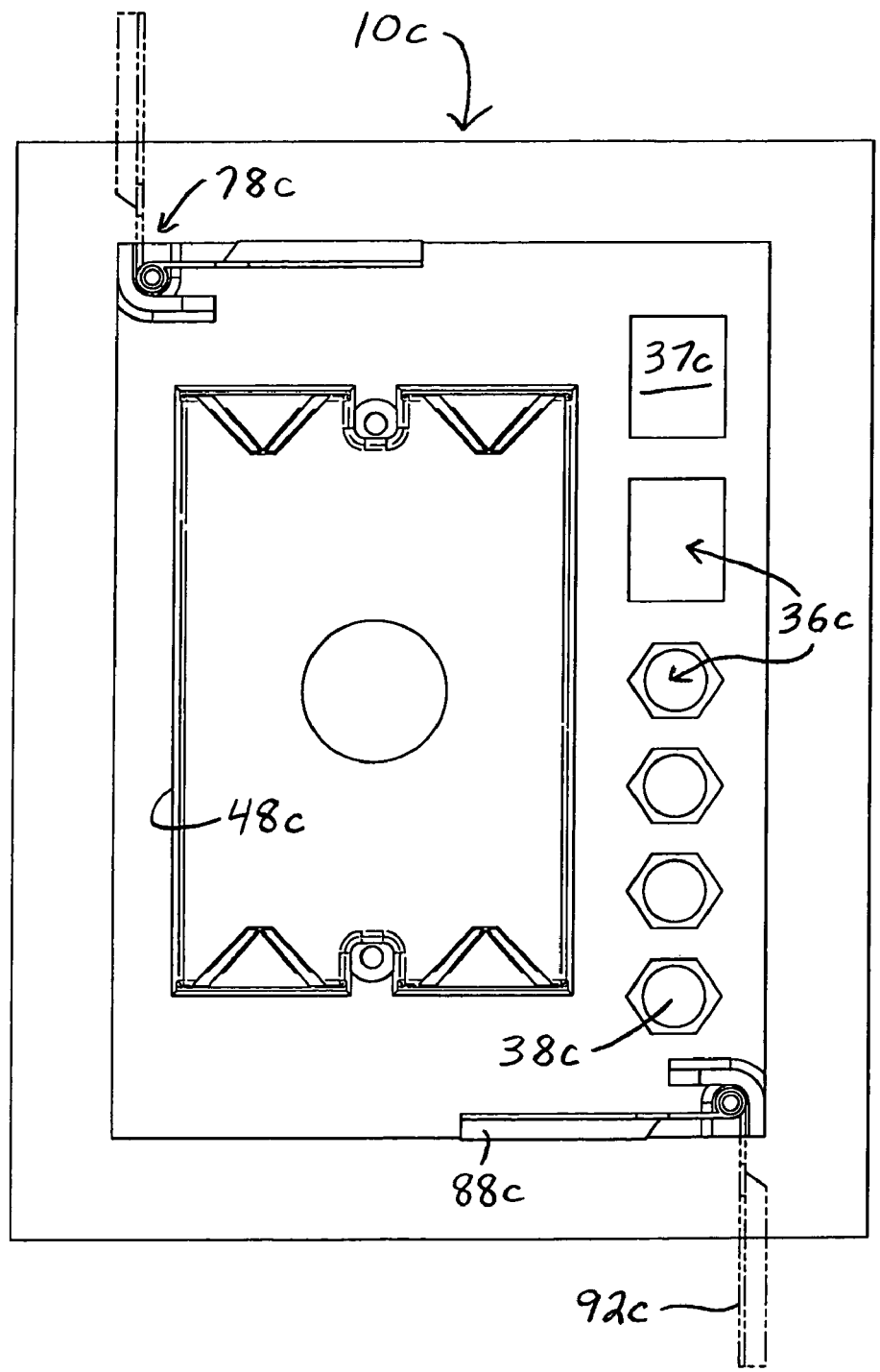
FIG. 15 is a rear elevation view of the outlet box assembly of FIG. 14 showing the arms in the retracted and clamped positions.
Figure 16:
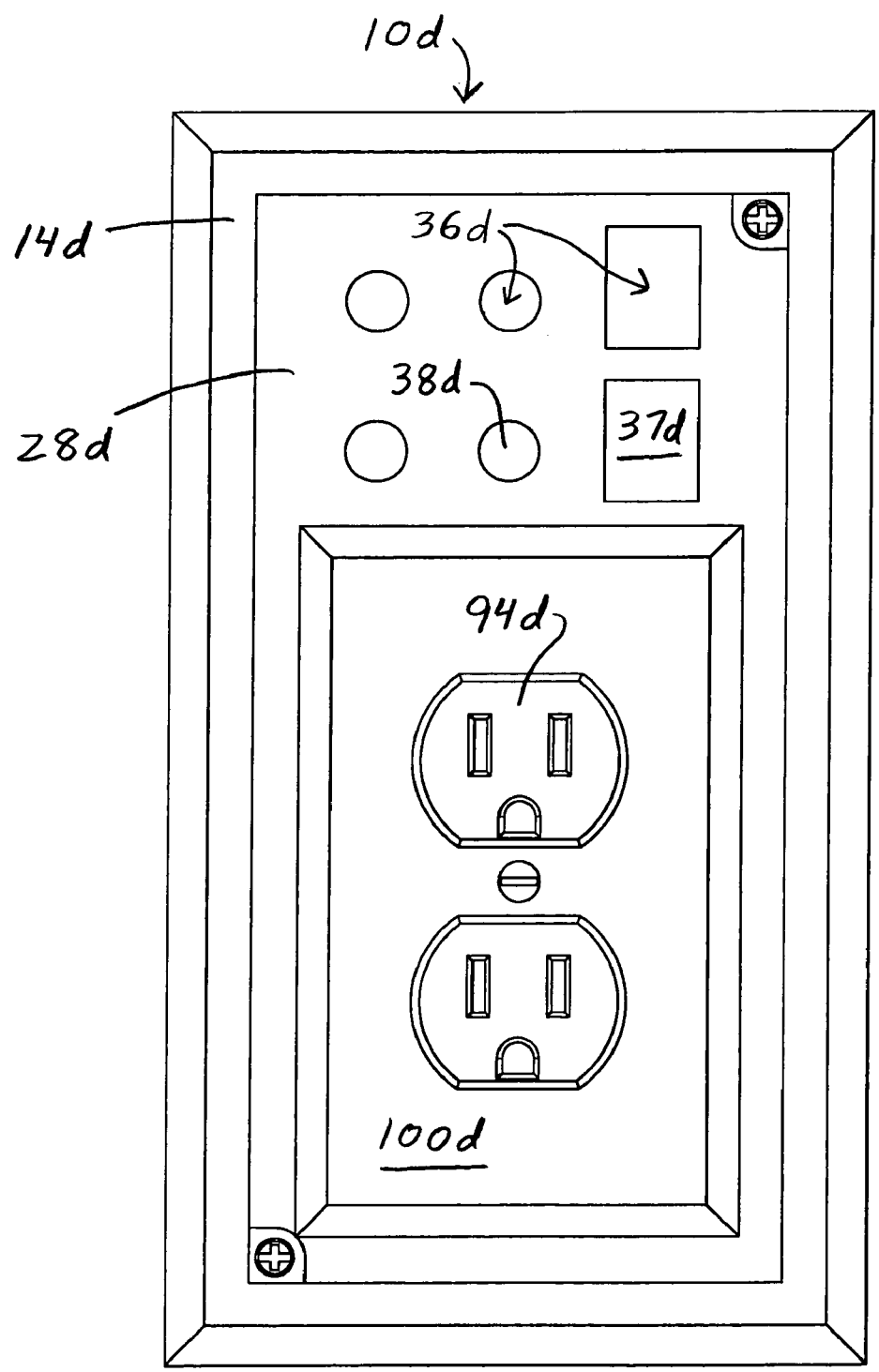
FIG. 16 is a front elevation view of an alternative fifth embodiment of the outlet box assembly of FIG. 1 after assembly of the electrical receptacle and interior faceplate thereto and removal of the knockouts from the outer faceplate, the outlet box assembly having an alternative configuration of the communication ports.
Figure 17:
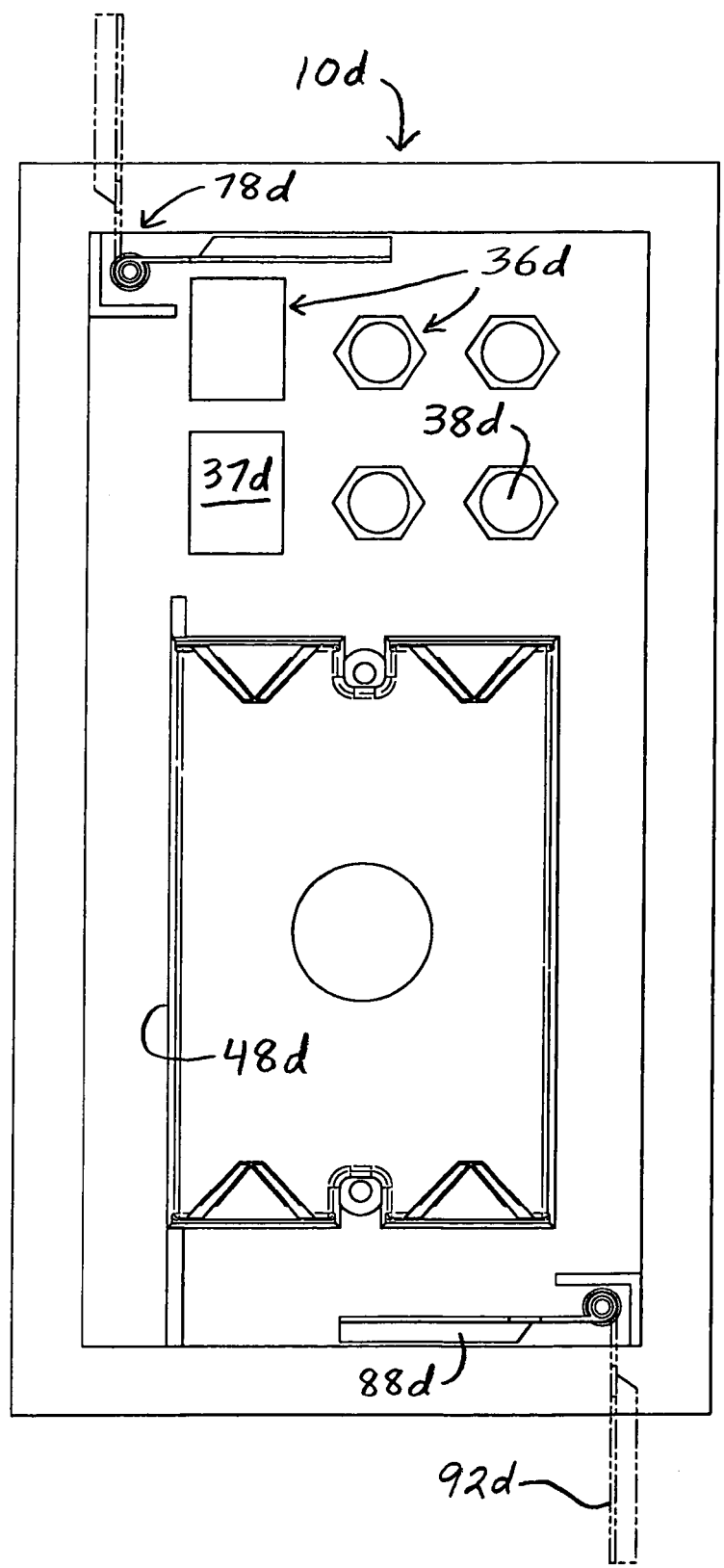
FIG. 17 is a rear elevation view of the outlet box assembly of FIG. 16 showing the arms in the retracted and clamped positions.
Figure 18:
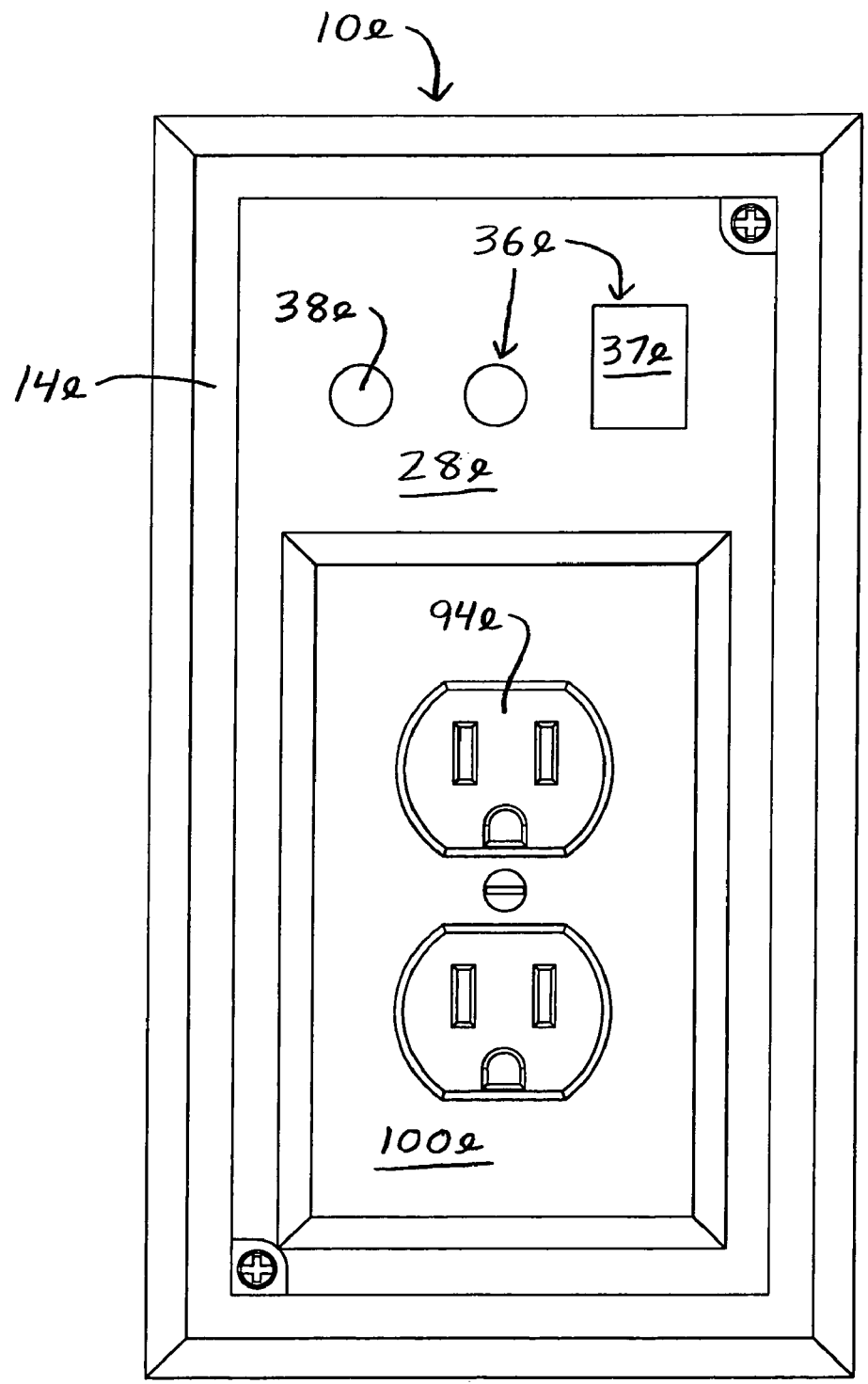
FIG. 18 is a front elevation view of an alternative sixth embodiment of the outlet box assembly of FIG. 1 after assembly of the electrical receptacle and interior faceplate thereto and removal of the knockouts from the outer faceplate, the outlet box assembly having an alternative configuration of the communication ports.
Figure 19:
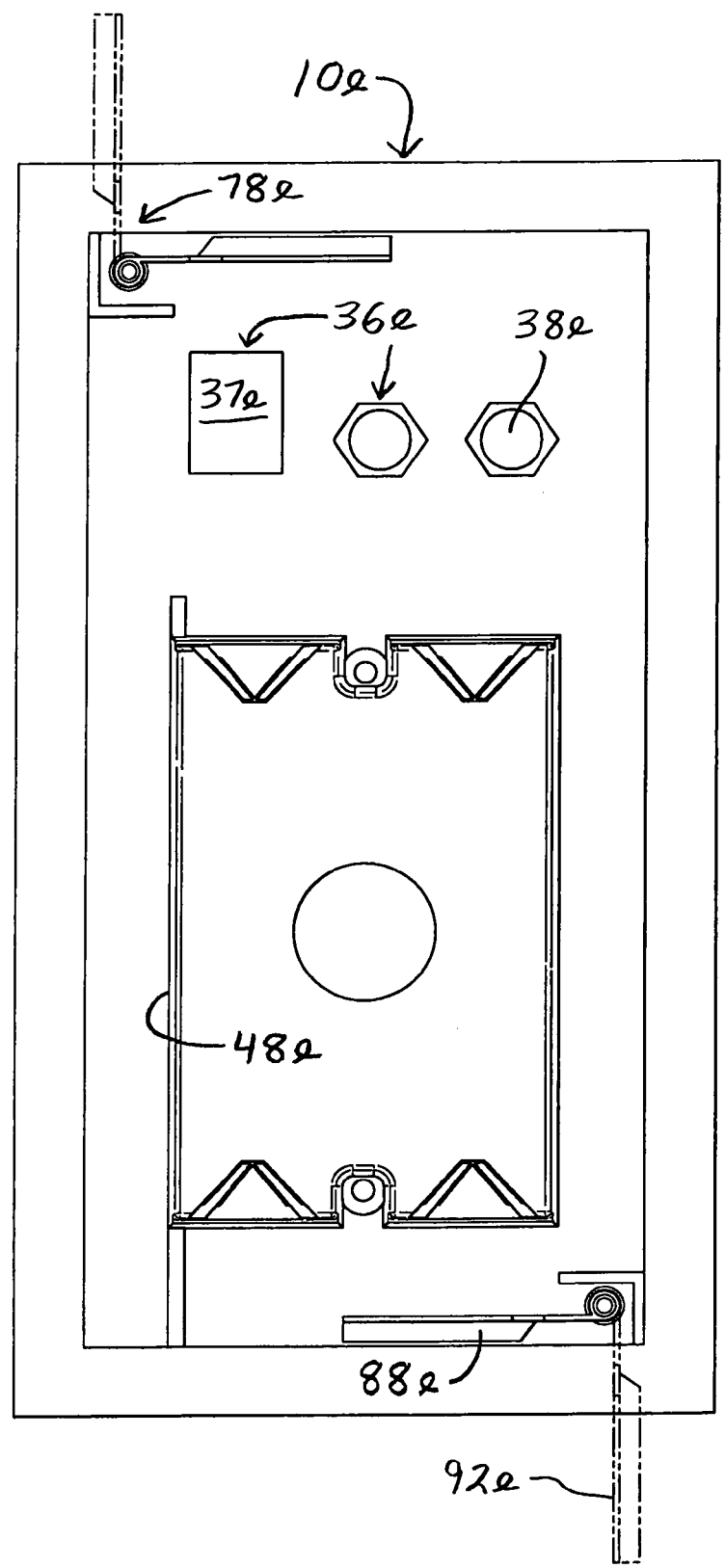
FIG. 19 is a rear elevation view of the outlet box assembly of FIG. 18 showing the arms in the retracted and clamped positions.

The cross-sections of the communication ports 36 may vary in shape to be compatible with the connectors to be supported therein. For example, as shown FIG. 8, the communication ports 36 may include rectangular communication ports 37 each of which has a rectangular cross-section. The communication ports 36 may further include circular/hexagonal communication ports 38 each of which has a forward end 40 which intersects the front surface 30 of the inner faceplate 28, as shown in FIG. 9. Each forward end 40 has a circular cross-section. The circular/hexagonal communication ports 38 each have a rear end 42 which intersects the rear surface 35 of the inner faceplate 28, as shown in FIG. 9. Each rear end 42 has a hexagonal cross-section.

Figure 3:
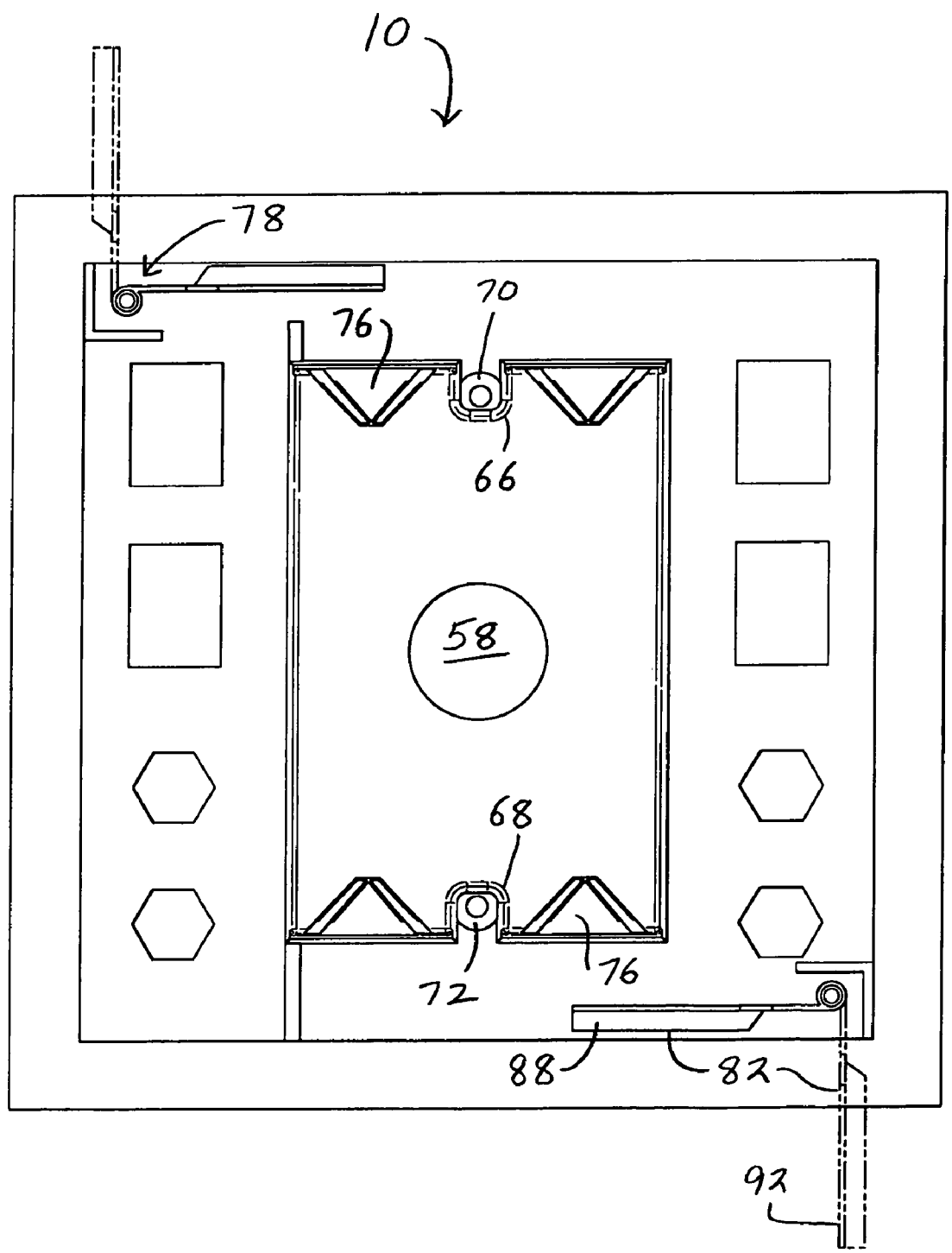
FIG. 3 is a rear elevation view of the outlet box assembly of FIG. 1 showing the arms in the retracted and clamped positions.

Additionally, the communication ports 36 may vary in number and in configuration relative to the outlet port 31. For example, as shown in FIGS. 2 and 3, the communication ports 36 are arranged such that two of the rectangular communication ports 37 are arranged above two of the circular/hexagonal communication ports 38 in respective columns on either side of the outlet port 31.

Other configurations for the communication ports 36 are possible as shown in the alternative embodiments of FIGS. 10 to 19. Parts illustrated in FIGS. 10 to 19 which correspond to parts illustrated in FIGS. 1 to 9 have the same reference numeral as in FIGS. 1 to 9 with the addition of the suffix "a" in FIGS. 10 and 11, suffix "b" in FIGS. 12 and 13, suffix "c" in FIGS. 14 and 15, suffix "d" in FIGS. 16 and 17, and suffix "e" in FIGS. 18 and 19.

Figure 4:
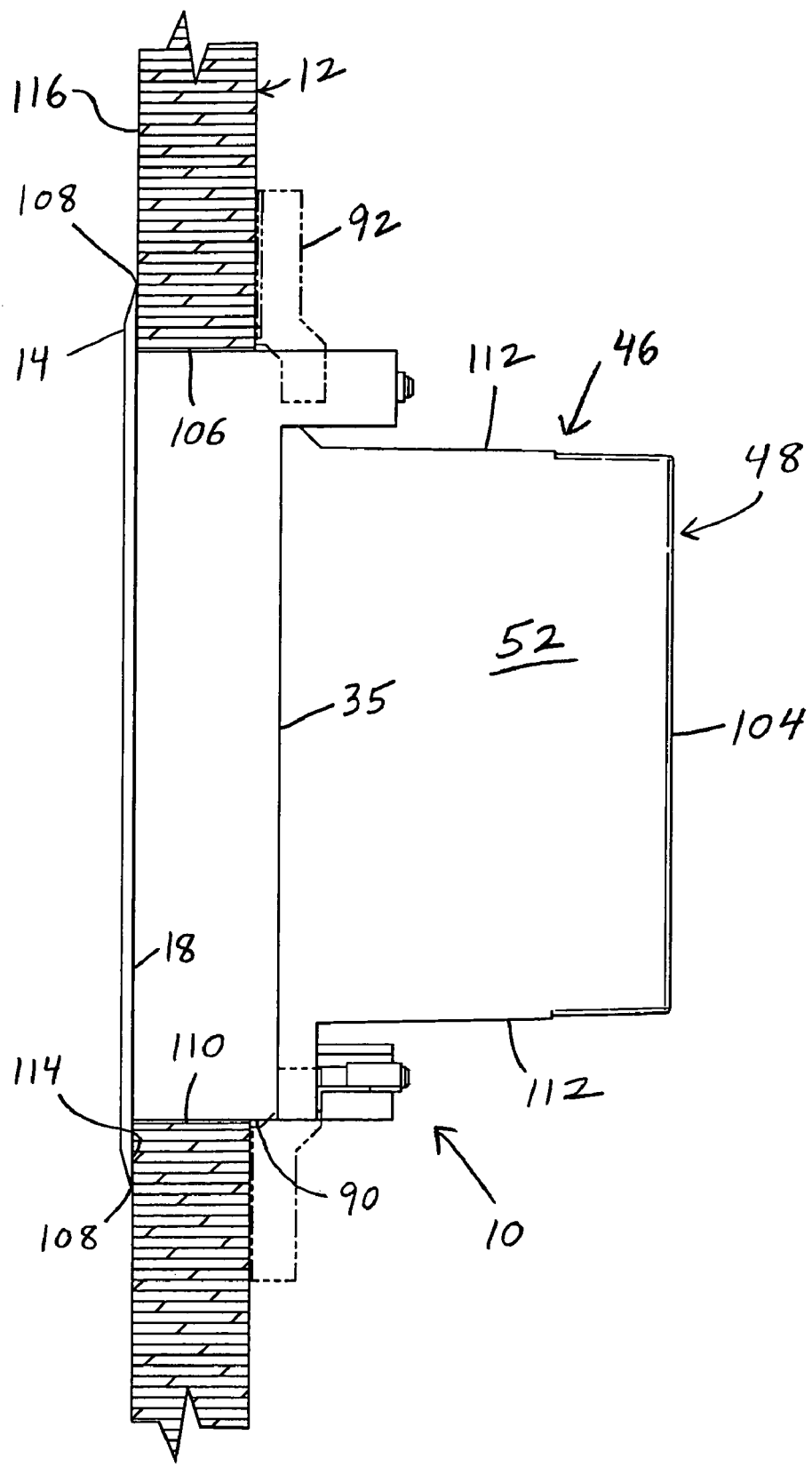
FIG. 4 is a right side elevation view of the outlet box assembly of FIG. 1 showing the arms in the clamped positions.
Figure 5:
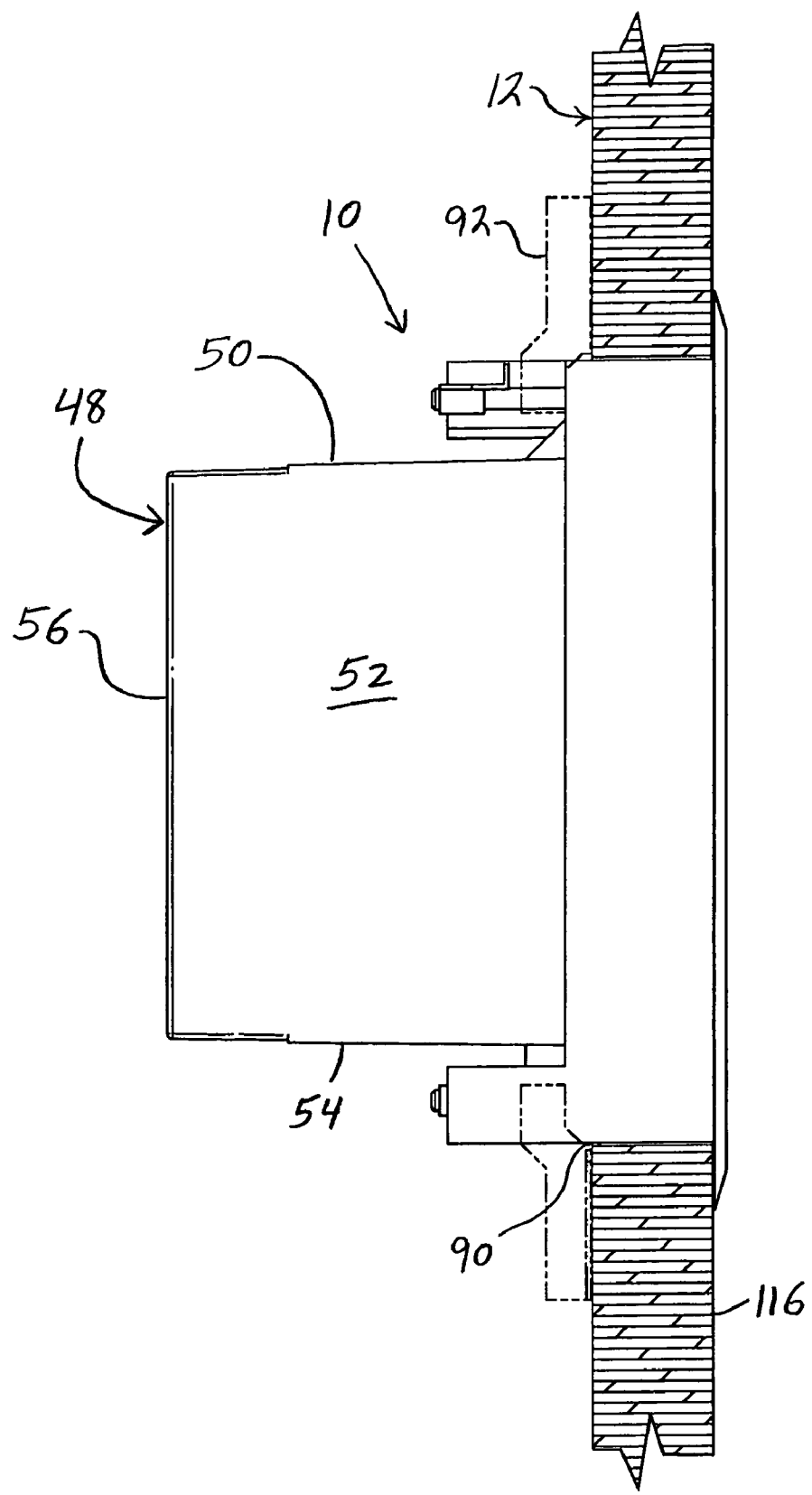
FIG. 5 is a left side elevation view of the outlet box assembly of FIG. 1 showing the arms in the clamped positions.
Figure 6:
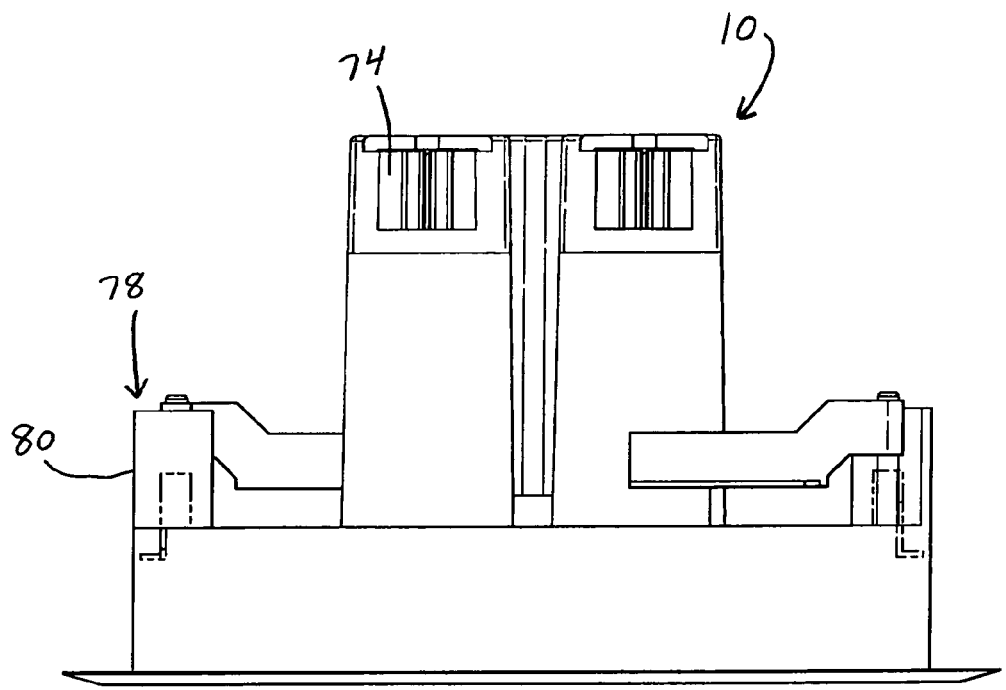
FIG. 6 is a top plan view of the outlet box assembly of FIG. 1.
Figure 7:
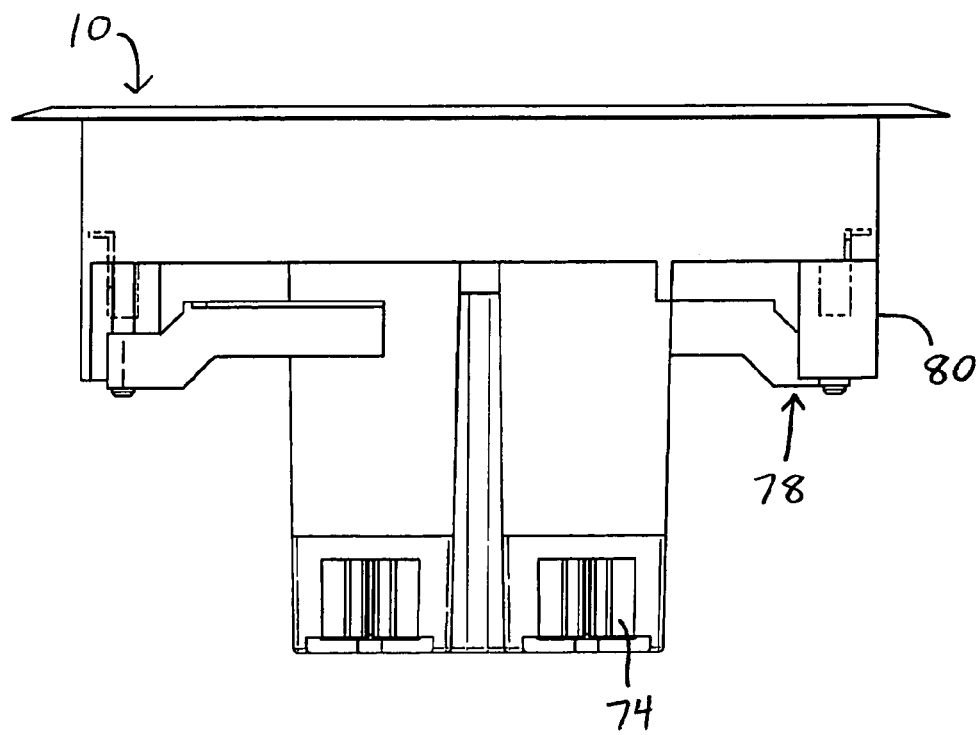
FIG. 7 is a bottom plan view of the outlet box assembly of FIG. 1.

Referring now to FIGS. 1, 4 and 5, the outlet box assembly 10 includes a support housing 46 having an outlet box 48 including a top wall 50, a pair of side walls 52, and a bottom wall 54 each of which has a front edge which is fixed to the rear surface 35 of the inner faceplate 28 such that the top, side and bottom walls are perpendicular to the inner faceplate 28. The top wall 50, side walls 52 and bottom wall 54 are fixed to one another such that each of the side walls is between the top and bottom walls in perpendicular relation thereto. This results in the outlet box 48 having a vertical cross-section which is rectangular.

The outlet box 48 includes a rear wall 56 fixed to the rear edges of the top wall 50, side walls 52 and bottom wall 54 such that the top, side and bottom walls are between the rear wall and inner faceplate 28 and the rear wall 56 is parallel to the inner faceplate 28. The rear wall 56 has a dome-shaped protrusion 58 extending inwardly from the front surface thereof and a corresponding indentation on the rear surface of the rear wall. Elongate support ribs 60 are secured to the front surface of the rear wall 56. The support ribs 60 bisect the front surface both horizontally and vertically and intersect the dome-shaped protrusion 58. The dome-shaped protrusion 58 and support ribs 60 provide structural support to the rear wall 56.

The top wall 50, side walls 52, bottom wall 54, and rear wall 56 each have an inner surface each of which defines a portion of the inner surface 62 of the support housing 46. The inner surface 62 bounds an interior region 64 of the support housing 46. Access to the interior region 64 is provided by the outlet port 31.

The support housing 46 includes an upper shoulder 66 which extends downwardly from the lower surface of the top wall 50, and a lower shoulder 68 which extends upwardly from the upper surface of the bottom wall 54. The upper and lower shoulders 66, 68 are formed by elongate recesses in the upper surface of the top wall 50 and lower surface of the bottom wall 54, as shown in FIG. 3. The upper and lower shoulders 66, 68 are perpendicular to the plane of the inner faceplate 28 and are equidistant from the side walls 52.

The inner faceplate 28 has upper and lower tab portions 70, 72 which extend downwardly and upwardly, respectively, to cover the forward ends of the upper and lower shoulders 66, 68. Each of the tab portions 70, 72 has an opening through which an elongate fastener may be inserted.

The top and bottom walls 50, 54 each have a pair of notches 74 at the corners formed by the intersection of the rear wall 56 with the top wall 50, side walls 52 and bottom wall 54. The forward ends of the notches 74 terminate at wire ports 76.

The outlet box assembly 10 includes a pair of clips 78 each of which has a post 80 and an arm 82 pivotally connected to the post in perpendicular relation thereto. Each post 80 is connected to the front surface 30 of the inner faceplate 28 adjacent to opposing corners thereof, as shown in FIGS. 1 and 2. Each of the arms 82 is coupled to an elongate member, such as a pin 84, which extends through an elongate cavity in the post 80, as shown in FIGS. 2 and 3. The forward end of the pin 84 has a head 86 to which may be coupled a tool for rotating the pin. Such coupling may be provided, for example, by forming in the front surface of the head 86 a recess which may be engaged by a screw driver. Rotation of the pin 84, such as by a screw driver, causes pivoting of the arm 82 about the associated post 80. Each of the arms 82 may be thereby be swung between a retracted position 88 in which the arm is within the outer periphery 90 of the inner faceplate 28 and a clamped position 92 in which the arm extends beyond the outer periphery 90.

The outlet box assembly 10 is prepared for mounting to the wall structure 12 by removing the knockouts 33, such as by applying a force thereto which is sufficient to fracture the knockouts from the inner faceplate 28. Such fracturing will occur along the grooves 34 resulting in the cross-sections of the communication ports 36 having the specific shapes shown in FIGS. 2, 3, and 10 to 19. Alternatively, the knockouts 33 may be removed by cutting the outer peripheries thereof at the grooves 34. Knockouts 33 which are removed by such cutting may be referred to as cutouts.

The preparation of the outlet box assembly 10 for mounting to the wall structure 12 further includes assembling an electrical receptacle 94 to the outlet box assembly. Such assembly may be either before or after the removal of the knockouts 33 from the inner faceplate 28.

The electrical receptacle 94 is assembled to the outlet box assembly 10 by insertion of the electrical receptacle 94 through the interior opening 16 and outlet port 31 into the interior region 64 of the support housing 46. The electrical receptacle 94 has an outer surface 96 and elongate slots 98 to receive the prongs of an electrical plug. When the electrical plug is inserted into the electrical receptacle 94, at least a portion of the plug or possibly the entire plug is contained within the flange structure 20.

The wire ports 76 provide a pathway for wires to extend from the electrical receptacle 94 within the interior region 64 to a location outside of the support housing 46. Provision of the wire ports 76 at the top and bottom walls 50, 54 accommodates wires which are connected to the top or bottom of the electrical receptacle 94, typically to the rear thereof. Such wires typically extend to the power source for the provision of electrical power to the electrical receptacle 94. This results in electrical power being supplied to an electrical plug inserted in the electrical receptacle 94.

The insertion of the electrical receptacle 94 into the interior region 64 is facilitated by the configuration of the support housing 46. For example, the configuration of the support housing 46 provides for a clearance between the inner surface 62 and the outer surface 96 of the electrical receptacle 94.

The electrical receptacle 94 is secured to the support housing 46 by a pair of elongate fasteners, such as screws, which extend through the upper and lower flanges of the electrical receptacle and through the upper and lower tab portions 70, 72 of the inner faceplate 28 to clamp together the respective tab portions and flanges.

The electrical receptacle 94 has a central bore into which an elongate fastener may be inserted. Such a fastener may be a screw the threads of which correspond to the threaded inner surface of the central bore. An interior faceplate 100 is secured to the front surface of the electrical receptacle 94 by the screw 102 extending through a central opening in the faceplate and into the central bore in the electrical receptacle. The interior faceplate 100 is planar and has an outer edge which may be beveled. The interior faceplate 100 is parallel to the outer and inner faceplates 14, 28 when the interior faceplate is secured to the electrical receptacle 94.

The outlet box assembly 10 is mounted to the wall structure 12 initially by orienting the assembly such that the outer and inner faceplates 14, 28 are vertical and the outer surface 104 of the rear wall 56 faces the opening 106 in the wall structure 12. The outer periphery 108 of the outer faceplate 14 extends beyond the periphery 110 of the opening 106 in the wall structure 12. The outer periphery 90 of the inner faceplate 28 is within the periphery 110. The outer vertical periphery 112 of the support housing 46 is within the outer periphery 90 of the inner faceplate 28. The outer vertical periphery 112 is contained in a plane which is parallel to the front surface 30 of the inner faceplate 28. The relative sizes of the peripheries 90, 112 allow the insertion of the inner faceplate 28 and support housing 46 through the opening 106. Before such insertion, the arms 82 are swung to the retracted positions 88 by rotating the associated pins 84, such as by engaging the heads 86 with a screw driver. When the arms 82 are in the retracted positions 88, the arms do not obstruct insertion of the inner faceplate 28 through the opening 106 in the wall structure 12. Accordingly, with the arms 82 in the retracted positions 88, the support housing 46 and inner faceplate 28 are inserted through the opening 106 in the wall structure 12.

The relative sizes of the peripheries 108, 110 of the outer faceplate 14 and opening 106 result in the inner surface 114 of the outer faceplate 14 squarely contacting the outer surface 116 of the wall structure 12 adjacent to the opening 106. The thickness of the outer faceplate 14 and longitudinal position of the arms 82 on the respective posts 80 results in the arms being to the rear of and adjacent to the wall structure 12 when the outer faceplate 14 squarely contacts the outer surface 116. This relative positioning of the arms 82 and the wall structure 12 allows the arms to be swung to the clamped positions 92 when the outer faceplate 14 squarely contacts the outer surface 116.

Following insertion of the support housing 46 and inner faceplate 28 into the opening 106 in the wall structure 12 such that the outer faceplate 14 squarely contacts the outer surface 116, the arms 82 are swung to the clamped positions 92 by rotating the associated pins 84, such as by engaging the heads 86 with a screw driver. Moving the arms 82 to the clamped positions 92 results in the wall structure 12 being clamped between the arms and the outer faceplate 14. This clamping obstructs forward retraction of the inner faceplate 28 through the opening 106 in the wall structure 12.

The clamping of the outer faceplate 14 against the outer surface 116 results in the flange structure 20 being within the opening 106. As a result, when the electrical plug is inserted into the electrical receptacle 94, at least a portion of the plug or possibly the entire plug is recessed from the outer surface 116.

The outlet box assembly 10 may be released and retracted from the opening 122 in the wall structure 12 by swinging the arms 82 to the retracted positions 88 by rotating the associated pins 84, such as by engaging the heads 86 with a screw driver. When the arms 82 are in the retracted positions 88, they do not obstruct forward retraction of the inner faceplate 28 through the opening 106 in the wall structure 12.

In an alternative embodiment of the outlet box assembly 10, it is possible for an inner faceplate corresponding to the inner faceplate 28 to be inclined relative to an outer faceplate corresponding to the outer faceplate 14. This inclination provides for both the outer and inner faceplates to have a vertical orientation when the alternative outlet box assembly is mounted on the wall structure 12. This mounting of the alternative outlet box assembly further provides for the inner faceplate to face in a direction which is inclined relative to an outlet port corresponding to the outlet port 31.

The inclination between the outer and inner faceplates may be provided by connecting one of the side edges of the inner faceplate 28 to the rear surface of the outer faceplate 14 such that the inner faceplate is inclined relative to the outer faceplate. In such a configuration, a flange structure corresponding to the flange structure 20 would include a rear wall having one side edge connected to the rear edge of the inner faceplate. The flange structure would further include top and bottom walls extending between the outer faceplate and rear wall. The flange structure would also have a side wall extending between the outer faceplate and side edge of the rear wall which is opposite to the inner faceplate.

This alternative embodiment includes an outlet box corresponding to the outlet box 48 connected to the rear surface of the inner faceplate in which an electrical receptacle corresponding to the electrical receptacle 94 is mounted. An interior faceplate corresponding to the interior faceplate 100 is secured to the front surface of the electrical receptacle.

In this alternative embodiment of the outlet box assembly, communication ports corresponding to the communication ports 36 may be contained in the rear wall. The communication ports may vary in number and cross-sectional shape. For example, the communication ports may be arranged such that two of the communication ports correspond to the rectangular communication ports 37 and are arranged above another two of the communication ports which correspond to the circular/hexagonal communication ports 38. The four communication ports may be arranged in a column located adjacent to the side edge of the rear wall which is opposite to the inner faceplate.

The inclination of the inner faceplate relative to the outer faceplate may provide for a larger portion of an electrical plug connected to the electrical receptacle to be recessed within the flange structure. This results in a larger portion of the electrical plug being recessed within the wall structure when the outlet box assembly is mounted therein. Also, the inclination may provide for the recess within the flange structure and, consequently the wall structure, of a larger portion of a cable plug connected to a receptacle supported in the communication port.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. An electrical box comprising:
   a first box including a back wall, orthogonally extending peripheral sidewalls including a plurality of wall portions joined together and surrounding the back wall, and an open front defining a first enclosure therein;
   said peripheral sidewalls having a front edge at said open front;
   a transverse wall portion extending outwardly and orthogonally from said peripheral side walls at said front edge;
   second peripheral sidewalls extending orthogonally from said transverse wall portion and forming a second box and a second enclosure therein;
   at least one flange integral with and extending outwardly and orthogonally from said second peripheral sidewalls;
   said second peripheral sidewalls terminating in a planar front edge of said second box;
   said planar front edge of said second box having an opening therein to said second enclosure; and
   a securement arrangement at said open front of said first enclosure for accepting an electrical device.

2. The electrical box of claim 1 wherein said first box, said second box, and said at least one flange are all integrally formed in one piece.

3. The electrical box of claim 1 wherein said back wall and said peripheral sidewalls of said first box include one or more wire ports for passage of wiring therein.

4. The electrical box of claim 1 wherein said securement arrangement includes
- integral projections from said peripheral sidewalls of said first box extending transversely into said first enclosure; and
- threaded bores in said integral projections.

5. The electrical box of claim 1 wherein said flange of said second box extends transversely substantially beyond said second peripheral sidewalls.

6. An electrical box comprising:
- a first box including a back wall, having peripheral sidewalls extending therefrom, and an open front defining a first enclosure therein;
- said peripheral sidewalls having a front edge at said open front;
- a transverse wall portion extending outwardly from said peripheral side walls;
- second peripheral sidewalls extending from said transverse wall portion and forming a second box and a second enclosure therein;
- at least one flange extending outwardly from said second peripheral sidewalls;
- said second peripheral sidewalls terminating in a planar front edge of said second box;
- said planar front edge of said second box having an opening therein to said second enclosure; and
- a securement arrangement at said open front of said first enclosure for accepting an electrical device.

* * * * *